United States Patent [19]

Teasdale

[11] Patent Number: 5,540,306
[45] Date of Patent: Jul. 30, 1996

[54] ADJUSTABLE CENTRIFUGAL BRAKE

[76] Inventor: Patrick Teasdale, 2600 Ave. Pierre Dupuy, #1006, Montréal, Québec, Canada, H3C 3R6

[21] Appl. No.: 537,362
[22] Filed: Oct. 2, 1995
[51] Int. Cl.$^6$ .................................................. F16D 15/00
[52] U.S. Cl. ............................................ 188/187; 188/180
[58] Field of Search ....................................... 188/180, 187

[56] References Cited

U.S. PATENT DOCUMENTS

| 2,372,579 | 3/1945 | Jefferson et al. | 188/187 |
| 2,491,003 | 12/1949 | Elmore | 188/187 |
| 5,302,161 | 4/1994 | Loubert et al. | 482/8 |

Primary Examiner—Matthew C. Graham
Attorney, Agent, or Firm—McDermott, Will & Emery

[57] ABSTRACT

The variable centrifugal brake is used for providing a load and for dissipating energy coming from a power input. The brake comprises a frame provided with a driven hub connectable to the power input. A floating plate is mounted on the hub with one side closely facing a contact surface on the frame. A cam bearing plate is further mounted on the hub and closely facing an opposite side of the floating plate. At least one cam assembly, radially pivotable around a pivot axis, is mounted on the cam bearing plate. Each cam assembly comprises a pressing portion adjacent to the pivot axis for lifting and lowering the floating plate as the cam assembly pivots around the pivot axis. The floating plate is then pressed against the contact surface by the pressing portion as the cam assembly pivots beyond a threshold angle and with a force proportional to the rotation speed of the cam assembly and to the position of flyweights connected along an elongated portion substantially projecting below the pivot axis. The brake is very suitable for apparatuses such as an exercise apparatus and for numerous other applications.

9 Claims, 8 Drawing Sheets

ADJUSTABLE CENTRIFUGAL BRAKE

FIELD OF THE INVENTION

The present invention relates to an adjustable centrifugal brake using one or more cam assemblies with flyweights and where the braking force is a function of the rotation speed and of the position of the flyweights.

BACKGROUND OF THE INVENTION

There are in the art numerous devices for providing a braking force to mechanical systems. One use for brakes, among numerous other possible applications, is to provide a load in exercise apparatuses. U.S. Pat. No. 5,302,161 (Loubert et al.) of 1994 discloses an example of such brake. However, the brake of Loubert et al. is not easily adjustable.

SUMMARY OF THE INVENTION

The object of the present invention is to provide an easily adjustable centrifugal brake that is a function of the rotation speed and of the position of the flyweights.

More particularly, the object of the present invention is to provide a variable centrifugal brake, the brake comprising:

- a frame having a contact surface;
- a driven hub operatively connected to the frame and rotatable around a longitudinal axis, the hub being substantially perpendicular to the contact surface and being connectable to a power input;
- a floating plate mounted on the hub and having one side closely facing the contact surface;
- a friction means for providing friction between the floating plate and the contact surface;
- a connecting means for connecting in rotation the floating plate to the hub and maintaining the floating plate in front of the contact surface;
- a cam bearing plate mounted on the hub and closely facing an opposite side of the floating plate;
- at least one cam assembly operatively connected to the cam bearing plate, each cam assembly being radially pivotable around a pivot axis and comprising:
  - a pivot means for pivotally connecting the cam assembly to the cam bearing plate;
  - a pressing portion adjacent to the pivot axis for lifting and lowering the floating plate as the cam assembly pivots around the pivot axis, the floating plate being pressed against the contact surface by the pressing portion as the cam assembly pivots beyond a threshold angle;
  - an elongated portion substantially projecting below the pivot axis;
  - a flyweight operatively connected to a variable location along the elongated portion; and
- a flyweight adjustment means for varying the location of the flyweight along the corresponding elongated portion.

A non restrictive description of a preferred embodiment will now be given with reference to the appended drawings.

DESCRIPTION OF A PREFERRED EMBODIMENT

Figure 1:
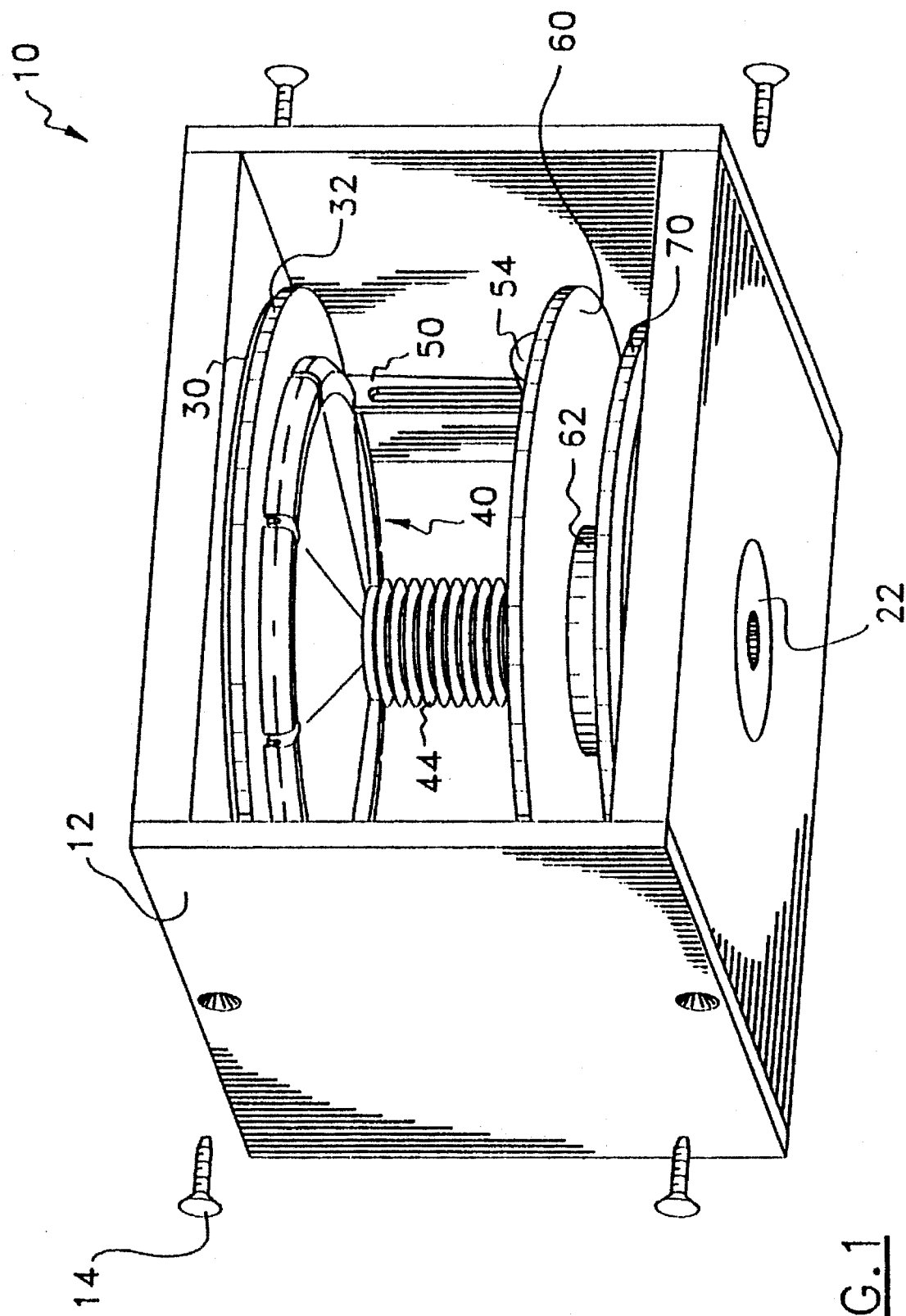
FIG. 1 is a perspective view of the centrifugal brake according to a preferred embodiment of the present invention.

Referring to the drawings, there is shown a variable centrifugal brake (10) according to a preferred embodiment of the present invention.

The brake (10) comprises a frame (12) which may be in the form of four panels maintained together by screws (14), as shown in FIG. 1.

A hub (20) is operatively connected to the frame (12) and rotatable around a longitudinal axis. Bearings (22) hold the hub (20) between two substantially perpendicular panels. In use, the hub (20) is driven by a power input from the exercise apparatus. One among many possible embodiments apparent to a person skilled in the art for the connection between an external power input and the hub (20) is a pulley (70) adapted for receiving a belt or a chain (not shown).

Figure 3:
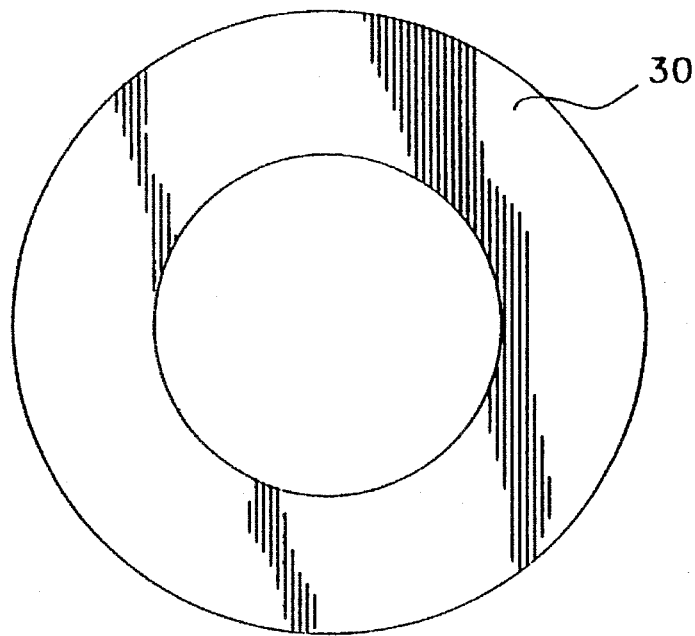
FIG. 3 is a top plan view of the friction lining in FIGS. 1 and 2.

A floating plate (32) is mounted on the hub (20) with one side closely facing one panel of the frame (10) acting as a contact surface. A connecting means is provided for connecting in rotation the floating plate (32) to the hub (20) and maintaining the floating plate (32) within a maximum distance from the contact surface. Energy is dissipated between the floating plate (32) and the contact surface when they are engaged to each other with a mechanism explained further in the text. A friction means, such as a friction lining (30), preferably having a substantially circular shape as shown in FIG. 3, is used for providing friction between the floating plate (32) and the contact surface. The friction lining (30) is secured to the floating plate (32) or to the contact surface. The friction means may also be with the floating plate (32) and the contact surface themselves if the materials used provide a suitable friction coefficient. Other shapes and arrangements are also possible, as apparent to a person skilled in the art.

A cam bearing plate (40) is mounted on the hub (20) and closely facing an opposite side of the floating plate (32). One purpose for the cam bearing plate is to bear at least one cam assembly (50) provided in the brake (10). Each cam assembly (50) is radially pivotable around a corresponding pivot axis 32. The cam bearing plate (40) is preferably mounted on the hub (20) by means of an appropriate securing device (42), such as hexagonal set screws. Other arrangements, such as a welding, are of course suitable, as apparent to a person skilled in the art.

Figure 2:
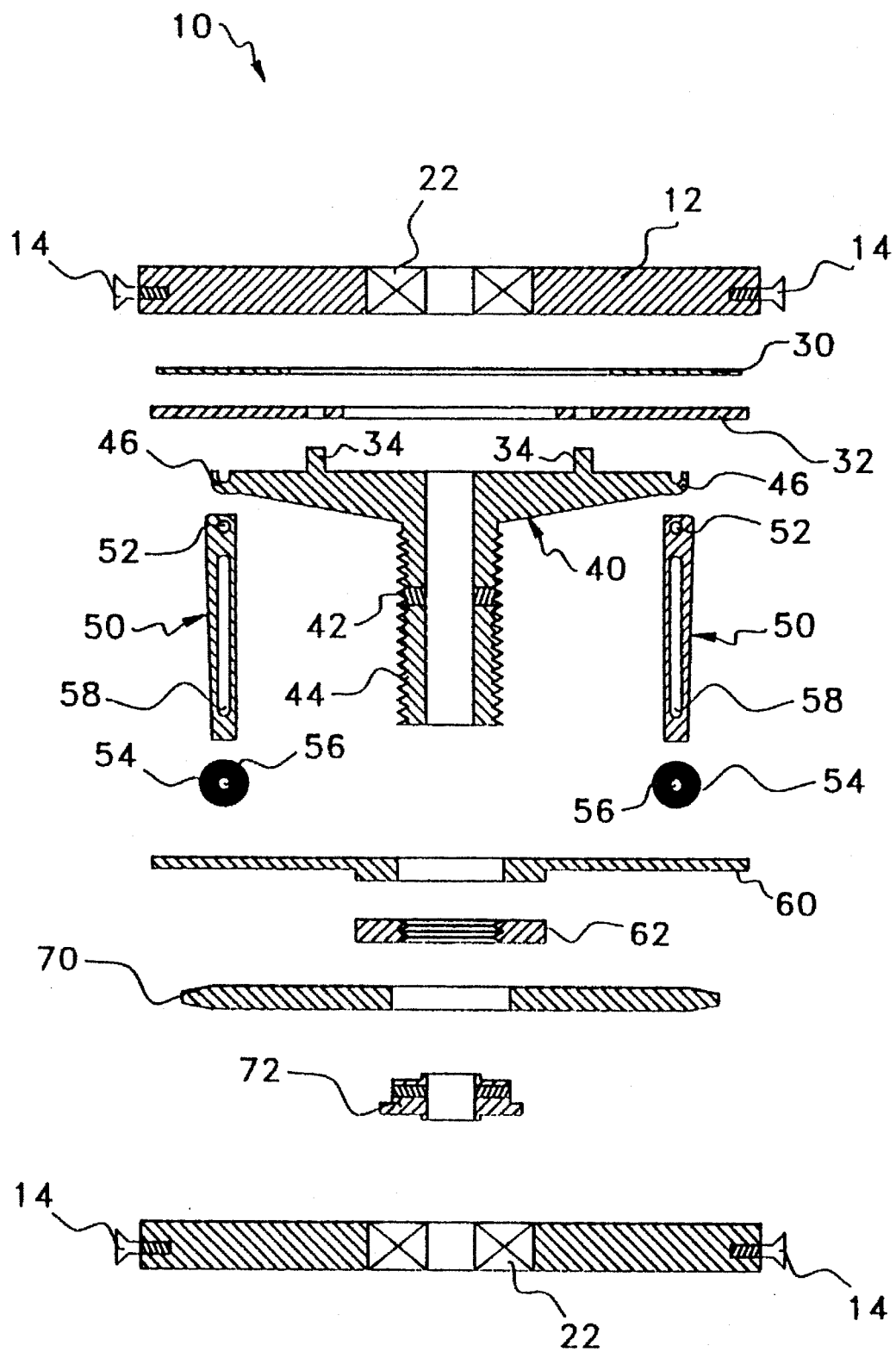
FIG. 2 is an exploded cross-sectional view of the brake in FIG. 1.
Figure 4:
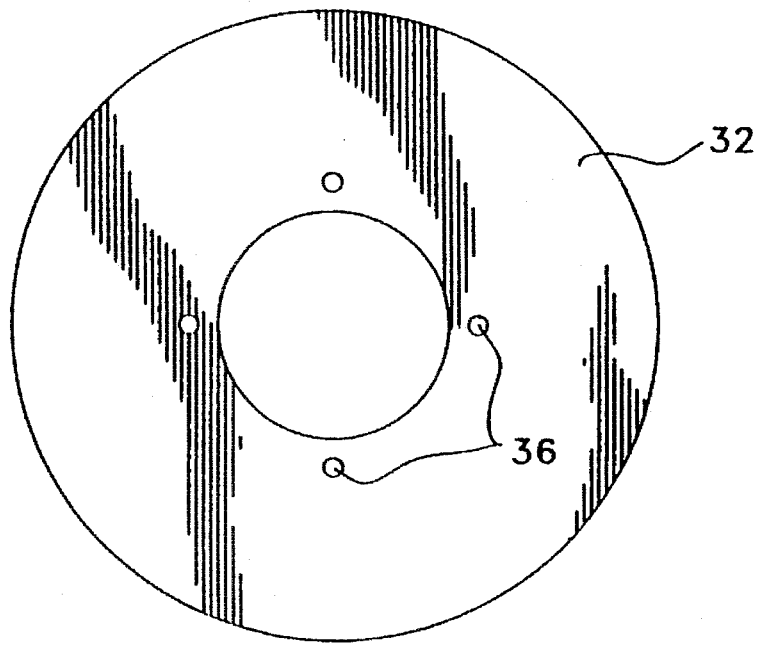
FIG. 4 is a top plan view of the floating plate in FIGS. 1 and 2.
Figure 5:
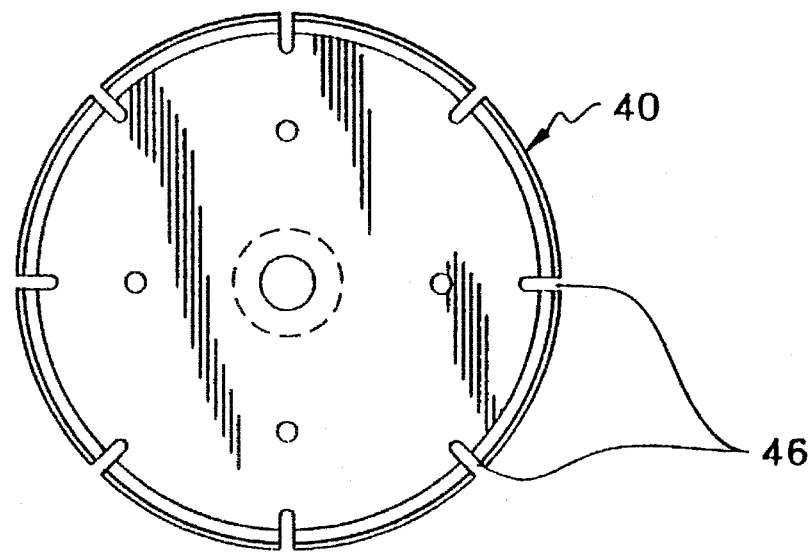
FIG. 5 is a top plan view of the cam bearing plate in FIGS. 1 and 2.

The cam bearing plate (40) may also bear the connecting means for the floating plate (32). As shown for instance in FIG. 2, the connecting means may comprise pegs (34) projecting from the cam bearing plate (40) and insertable into corresponding holes (34) provided on the floating plate (32). FIGS. 4 and 5 show respectively a top view of an example of the floating plate (32) and the cam bearing plate (40).

Each cam assembly (50) is operatively connected to the cam bearing plate (40) at a given distance from the hub (20). A pivot means, like a transversal axle (52), is provided for pivotally connecting the cam assembly (50) to a corresponding fork-like cam support (46) on the cam bearing plate (40). Other kinds of supports (46) are possible.

Each cam assembly (50) comprises a pressing portion adjacent to the pivot axis (52) for lifting and lowering the floating plate (32) as the cam assembly (50) pivots around the pivot axis (52). In the preferred embodiment, a pressing portion slightly projects upwardly. It may however be on the side of the pivot axis (52).

An elongated portion substantially projects below the pivot axis (52) and is adapted to receive a flyweight (54) operatively connected to a variable location along the elongated portion. More particularly, the variable location may be defined as almost any location along the elongated portion. Preferably, the flyweight (54) has a substantially circular shape and is rotatable around a corresponding rotation axis (56). The elongated portion of each cam assembly (50) also preferably comprises a longitudinal slot lying in a radial plate for allowing longitudinal movement of the flyweight (54) along the elongated portion.

The purpose of having a variable location for the flyweights (54) is to be able to adjust the torque generated at the pivot axis (52) during the rotation of the cam assemblies (50) by changing the length of the lever arms between the corresponding centroid of the flyweights (54) and the corresponding pivot axis (52). In use, as the cam assemblies (50) rotate, the floating plate (32) will be pressed against the contact surface by the pressing portion as each cam assembly (50) pivots beyond a threshold angle. The threshold angle is defined as the angle where the friction between the floating plate (32) and the contact surface becomes significant. The pressing force is then proportional to the torque at the pivot axis (52), therefore proportional to the rotation speed of the cam assembly and to the position of the flyweights (54). The faster the rotation speed, the higher the torque is and the harder the pressing portions press the floating plate (32) on the contact surface, thereby dissipating more energy. At the same time, the farther are the flyweights (54) from the corresponding pivot axis (52), the higher the torque is and the harder the pressing portions press the floating plate (32) on the contact surface, thereby dissipating more energy.

Figure 9:
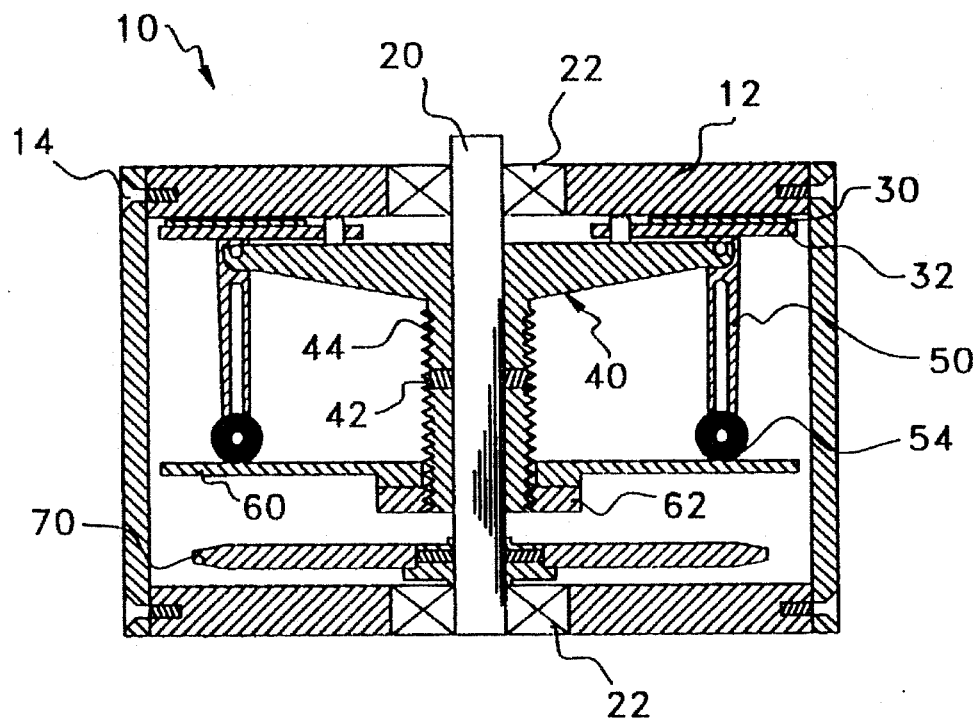
FIG. 9 is a cross-sectional view of the brake in FIG. 1, showing the flyweights at a first among numerous possible locations and substantially not subjected to the centrifugal force.
Figure 10:
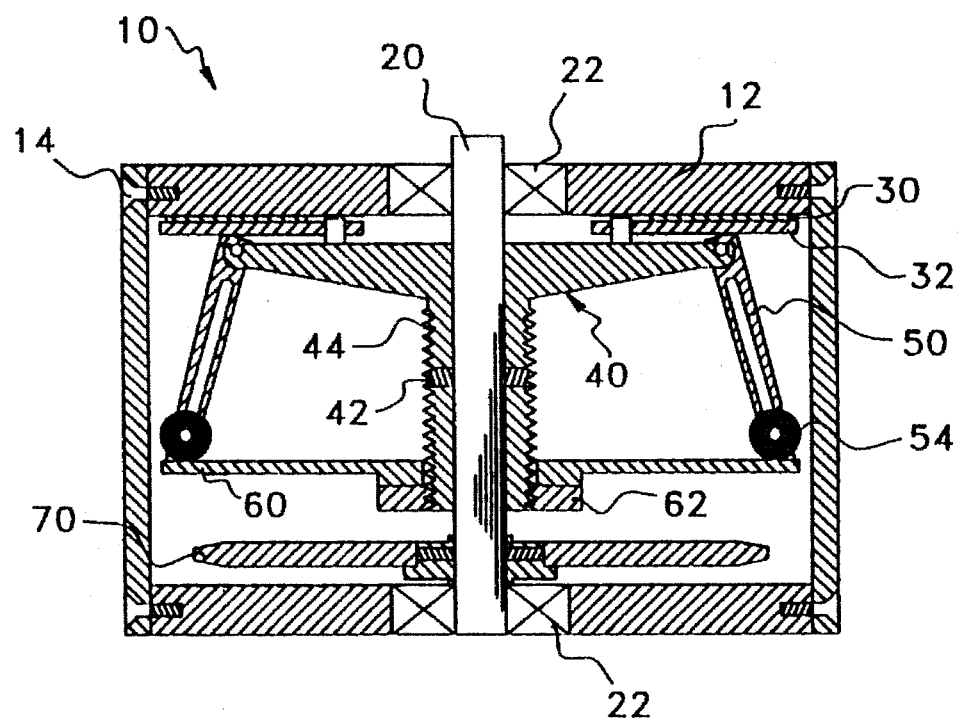
FIG. 10 is a view similar to FIG. 9, showing the flyweights subjected to the centrifugal force.

FIG. 9 shows an example of the brake (10) with no substantial rotation of the cam assemblies (50). At that point, the floating plate (32) is not pressed against the contact surface. However, an initial pressing force may be provided if the design requirements are such. As the rotation speed increases, the centrifugal force urges the cam assemblies (50) towards the exterior. The cam assemblies (50) will then pivot and the outer edge of the pressing portion will push the floating plate (32). As aforesaid, if the rotation speed is further increased, the pushing force will be greater. FIG. 10 shows the brake (10) with the floating surface pressing on the contact surface.

Figure 6:
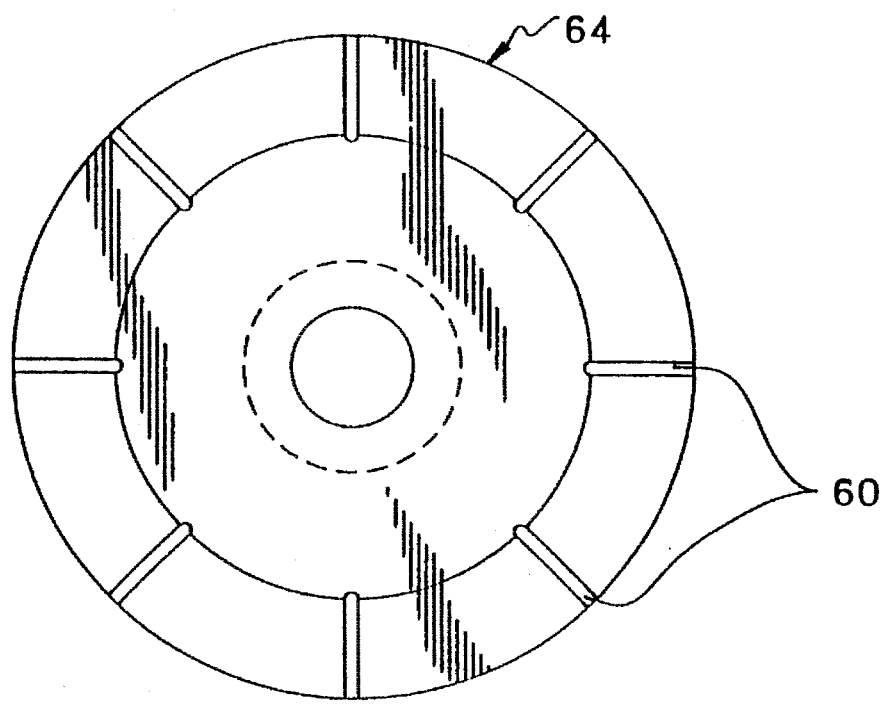
FIG. 6 is a top plan view of the supporting plate in FIGS. 1 and 2.
Figure 7:
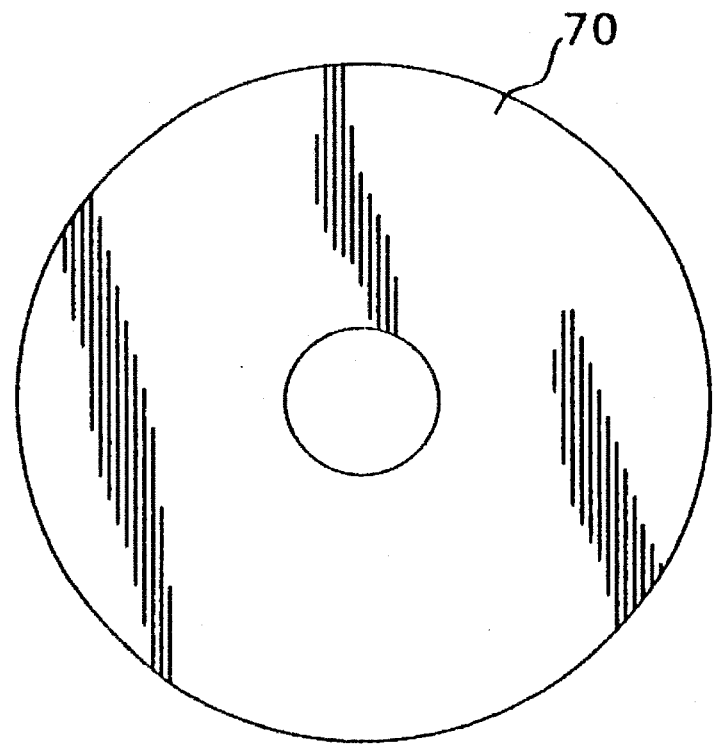
FIG. 7 is a top plan view of the pulley in FIGS. 1 and 2.
Figure 8:
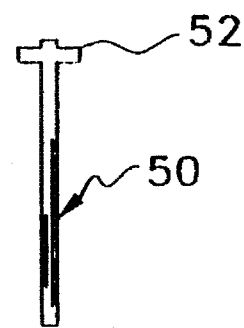
FIG. 8 is a side view of a cam assembly in FIGS. 1 and 2 shown without the flyweight.

In order to vary the location of the flyweight (54) along the corresponding elongated portion, the brake (10) comprises an adjusting means that may have many embodiments, such as screws, pins, etc. Preferably, the flyweight adjustment means comprises a supporting plate (60) mounted on the hub (20). The supporting plate (60) has radial slots (64), shown in FIG. 6, each being aligned with the elongated portion of a corresponding cam assembly (50) for allowing the same to pivot while the flyweights (54) roll on a surface of the supporting plate (60).

It should be noted that the term "plate" does not necessarily imply that it is disk-shaped and uniform. All plates may comprise radial portions connected together near the hub (20). The supporting plate (60) may also have a curve for changing the braking performance according to the angle of the cam assemblies (50).

A supporting plate connection means is further provided for adjustably connecting the supporting plate (60) to a location along the hub (20). Preferably, the cam bearing plate (40) comprises a portion coaxial with the hub (20) and downwardly projecting on a side opposite the floating plate (30). This portion bears external threads (44) so that a nut (62) acting as the supporting plate connection means may be in mesh therewith. Of course, the threads (44) may be provided directly on the hub (20) or on any portion projecting from another element. Other arrangements for the supporting plate connection means are also possible.

Figure 11:
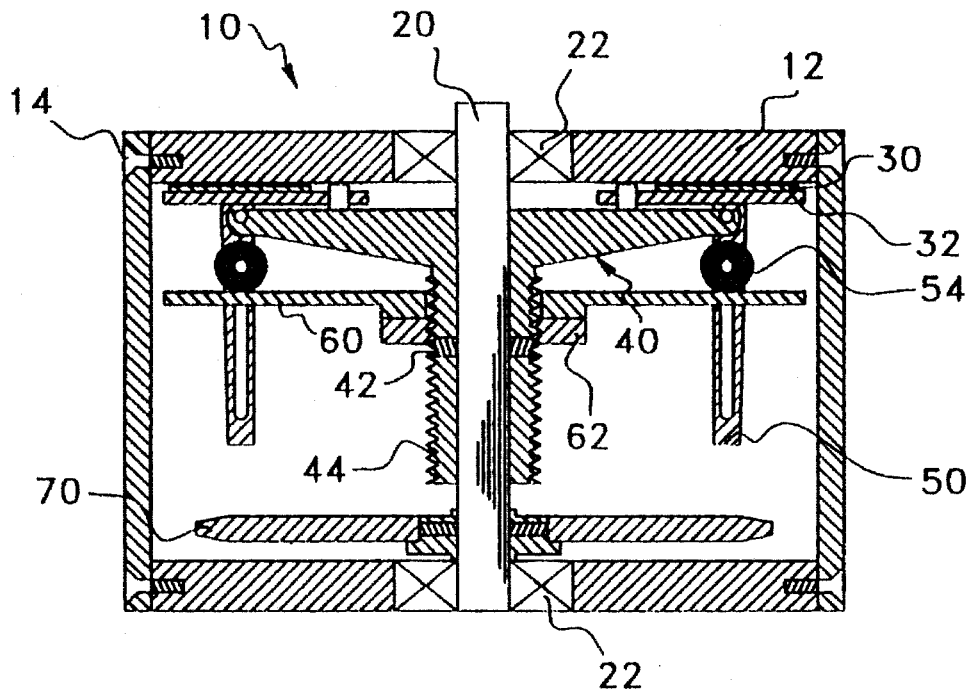
FIG. 11 is a cross-sectional view of the brake in FIG. 1, showing the flyweights at a second location and substantially not subjected to the centrifugal force.
Figure 12:
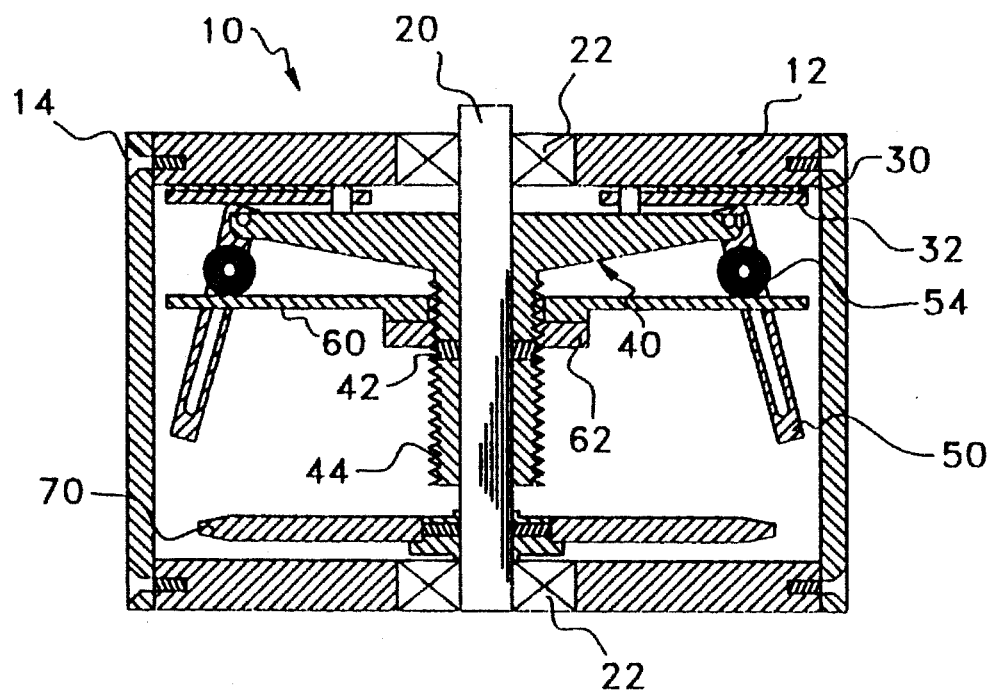
FIG. 12 is a view similar to FIG. 11, showing the flyweights subjected to the centrifugal force.

As shown in FIGS. 11 and 12, the flyweights (54) may be set to a different location along their corresponding elongated portion. Compared with the corresponding FIGS. 9 and 10, the brake (10) as set in FIGS. 11 and 12 will have less braking power than the other. The load is therefore less important if the brake (10) is set like in FIGS. 11 and 12.

Figure 13:
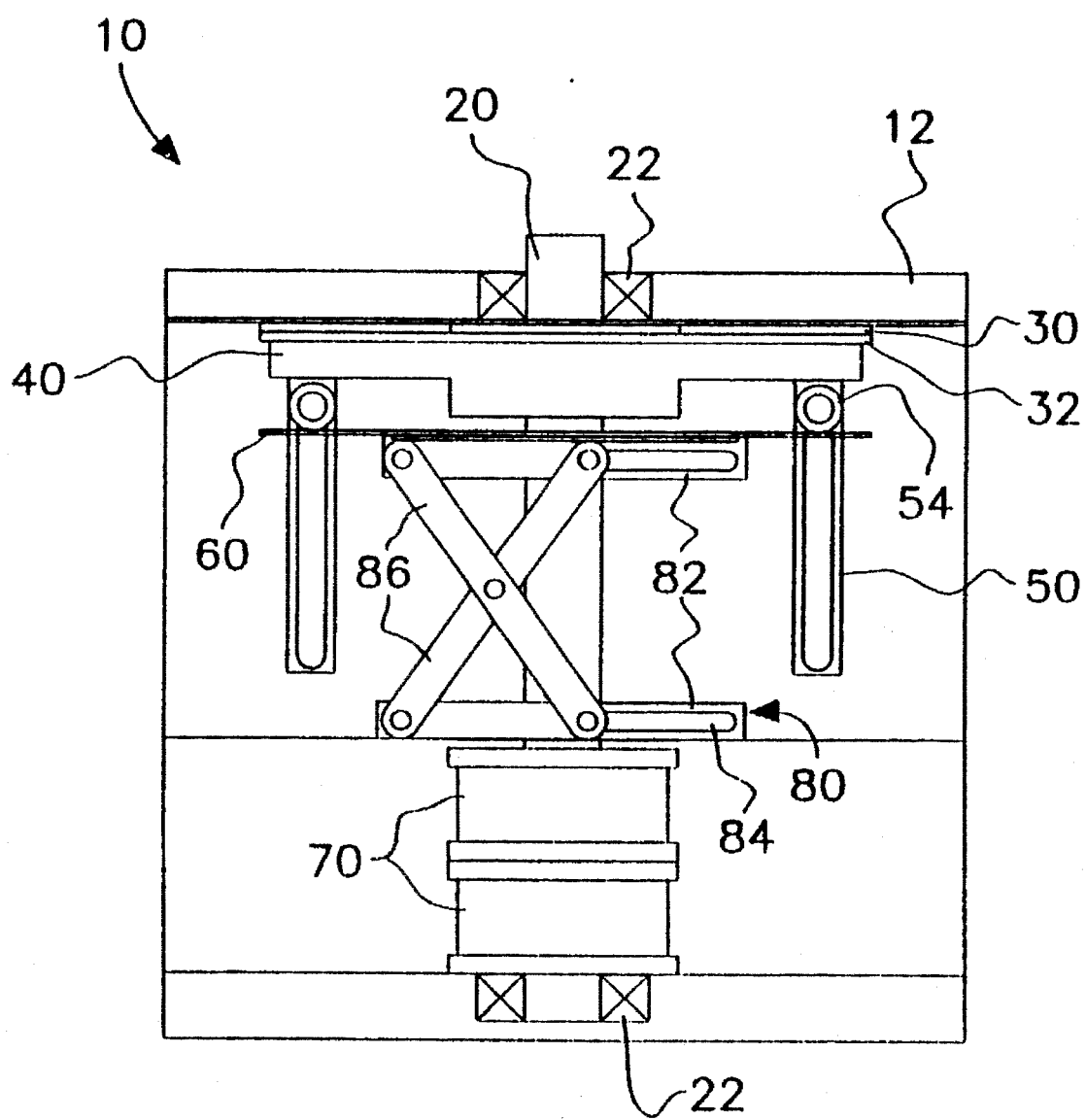
FIG. 13 is a simplified side view of the centrifugal brake according to the present invention, showing an adjustable positioning assembly for positioning the supporting plate.

FIG. 13 shows an example of an adjustable positioning assembly (80) used instead of or in conjunction with the nut (62). The positioning assembly (80) preferably comprises two rails (82), the lower one being rigidly attached to the frame (12) while the upper one is supporting the supporting plate (60). Two members (86) are provided in an X-like configuration, each with one end pivotally connected to a rail (82) and another end slidably connected to a slot (84). By moving the lower slidable end, it is possible to change the height of the supporting plate (60). A lever or a motor (not shown) may be used for that purpose.

In conclusion, the brake (10) according to the present invention provides a very convenient way to create an adjustable load in an exercise apparatus that is also a function of the speed of the movement performed by the user and the position of the flyweights (54), as set by the user.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. An adjustable centrifugal brake, the brake comprising:

a frame having a contact surface;

a driven hub operatively connected to the frame and rotatable around a longitudinal axis, the hub being substantially perpendicular to the contact surface and being connectable to a power input;

a floating plate mounted on the hub and having one side closely facing the contact surface;

a friction means for providing friction between the floating plate and the contact surface;

a connecting means for connecting in rotation the floating plate to the hub and maintaining the floating plate in front of the contact surface;

a cam bearing plate mounted on the hub and closely facing an opposite side of the floating plate;

at least one cam assembly operatively connected to the cam bearing plate, each cam assembly being radially pivotable around a pivot axis and comprising:

a pivot means for pivotally connecting the cam assembly to the cam bearing plate;

a pressing portion adjacent to the pivot axis for lifting and lowering the floating plate as the cam assembly pivots around the pivot axis, the floating plate being pressed against the contact surface by the pressing portion as the cam assembly pivots beyond a threshold angle;

an elongated portion substantially projecting below the pivot axis;

a flyweight operatively connected to a variable location along the elongated portion; and a flyweight adjustment means for varying the location of the flyweight along the corresponding elongated portion.

2. A brake according to claim 1, wherein the flyweight adjustment means comprises:

a supporting plate mounted on the hub, the supporting plate having radial slots, each aligned with the elongated portion of a corresponding cam assembly for allowing the same to pivot while the flyweights move radially on a surface of the supporting plate; and a supporting plate connection means for adjustably connecting the supporting plate to a location along the hub.

3. A brake according to claim 2, wherein each flyweight has a substantially circular cross section and is rotatable around a corresponding rotation axis for rolling on the supporting plate while moving radially.

4. A brake according to claim 2, wherein the cam bearing plate comprises a portion coaxial with the hub and projecting on a side opposite the floating plate, the portion bearing external threads, the supporting plate connection means comprising a nut coaxial with the hub and in mesh with some threads.

5. A brake according to claim 1, wherein the flyweight adjustment means comprises:

a supporting plate mounted on the hub, the supporting plate having radial slots, each aligned with the elongated portion of a corresponding cam assembly for allowing the same to pivot while the flyweights move radially on a surface of the supporting plate; and an adjustable positioning means for positioning the supporting plate to a location along the hub.

6. A brake according to claim 5, wherein each flyweight has a substantially circular cross section and is rotatable around a corresponding rotation axis for rolling on the supporting plate while moving radially.

7. A brake according to claim 1, wherein the elongated portion of each cam assembly comprises a longitudinal slot lying in a radial plate for allowing longitudinal movement of the flyweight along the elongated portion.

8. A brake according to claim 1, wherein the friction means comprises a substantially circular friction lining.

9. A brake according to claim 1, further comprising a pulley coaxial with the hub and rigidly connected thereon for receiving power from the power input.

* * * * *